J. N. RUSSELL.
LOG TRACK.
No. 179,352. Patented June 27, 1876.
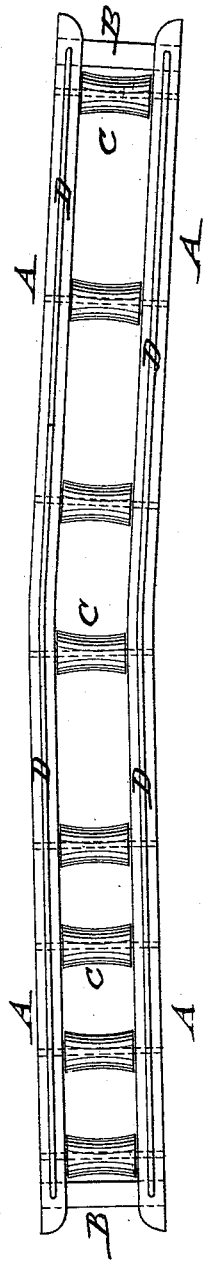
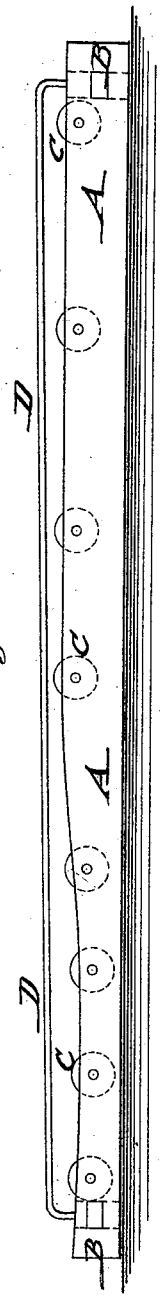
WITNESSES:
H. Rydquist
John Goethals
INVENTOR:
J. N. Russell
BY
ATTORNEYS.

UNITED STATES PATENT OFFICE.

JEWIT N. RUSSELL, OF AUGUSTA, WISCONSIN.

IMPROVEMENT IN LOG-TRACKS.

Specification forming part of Letters Patent No. 179,352, dated June 27, 1876; application filed May 1, 1876.

*To all whom it may concern:*

Be it known that I, JEWIT N. RUSSELL, of Augusta, in the county of Eau Claire and State of Wisconsin, have invented an Improvement in Log-Tracks, of which the following is a specification:

In the accompanying drawing, Figure 1 represents a top view, and Fig. 2 a side view, of my improved log-track.

Similar letters of reference indicate corresponding parts.

My invention relates to an improved road or track for hauling logs, by which they may be transported in cheaper and quicker manner than by the use of sleds, wagons, or tramways; and the invention consists of a track made of longitudinally-jointed sleepers, with lateral braces, revolving rollers, and side guards or railings.

In the drawing, A represents the longitudinal sleepers, which are laid securely on the ground, at equal distances throughout, from the place of cutting the trees to the place of floating or shipping the logs.

The sleepers A are laterally braced or connected by strong stiffening-pieces B, the track or road following the undulations and curves of the ground.

A number of concaved rollers, C, are arranged at suitable distances from each other, being closer together at curves and wider apart at straight sections, to convey readily the logs placed thereon.

The logs are coupled and drawn or pushed uphill and over the levels by horses walking at both sides of the track, being allowed to move downhill by merely letting them go.

The rollers C turn on supporting-pins, that serve also to hold the stringers together. A guard-railing, D, at both sides of the track, is secured firmly to the sleepers, and prevents the logs from jumping off the rollers in going downhill.

The log-track may be readily laid and taken up, built stronger and more durable than a tramway, used with equal facility in winter and summer, and does away with the use of sleds or rolling-stock.

Having thus described my invention, what I claim as new, and desire to secure by Letters Patent, is—

The combination, with longitudinal connected sleepers A A and railing D D, of centrally-concaved rollers, arranged substantially as and for the purpose specified.

JEWIT N. RUSSELL.

Witnesses:
D. JACKSON,
H. R. PLUMLEY.